US008579774B2

(12) United States Patent
Derscheid

(10) Patent No.: US 8,579,774 B2
(45) Date of Patent: Nov. 12, 2013

(54) DRIVE ROLLER FOR FLAT BELTS

(75) Inventor: Daniel Eric Derscheid, Ottumwa, IA (US)

(73) Assignee: Deere & Company, Moline, IL (US)

( * ) Notice: Subject to any disclaimer, the term of this patent is extended or adjusted under 35 U.S.C. 154(b) by 818 days.

(21) Appl. No.: 12/500,040

(22) Filed: Jul. 9, 2009

(65) Prior Publication Data
US 2011/0009251 A1 Jan. 13, 2011

(51) Int. Cl.
*A01B 29/00* (2006.01)
*B65G 23/04* (2006.01)
*F16H 55/36* (2006.01)

(52) U.S. Cl.
USPC ............ 492/30; 198/835; 474/188; 474/189; 474/184; 474/186; 474/187; 492/31; 492/33; 492/34; 492/35; 492/36

(58) Field of Classification Search
USPC ........ 492/28, 30, 31, 33, 34, 35, 36; 474/188, 474/189, 190, 191, 152, 184, 185, 186, 474/187; 198/835, 842, 494
See application file for complete search history.

(56) References Cited

U.S. PATENT DOCUMENTS

| | | | | |
|---|---|---|---|---|
| 685,680 A | * | 10/1901 | Galloway et al. | 474/188 |
| 1,335,421 A | * | 3/1920 | Black | 198/842 |
| 1,560,524 A | * | 11/1925 | Avery | 474/189 |
| 1,831,367 A | * | 11/1931 | Rosenthal | 474/189 |
| 1,980,777 A | * | 11/1934 | Zollinger | 198/829 |
| 2,082,684 A | * | 6/1937 | Chachula | 474/189 |
| 2,161,270 A | | 6/1939 | Anderson | |
| 2,628,709 A | | 2/1953 | Steinmetz | |
| 2,673,470 A | * | 3/1954 | Cosmos | 474/188 |
| 2,707,403 A | * | 5/1955 | Thomson et al. | 198/835 |
| 2,788,969 A | * | 4/1957 | Binder | 226/192 |
| 3,055,229 A | * | 9/1962 | Mecham | 198/835 |
| 3,078,205 A | * | 2/1963 | Flint, III et al. | 156/137 |
| 3,216,273 A | * | 11/1965 | Colmer, Jr. | 74/457 |
| 3,338,107 A | * | 8/1967 | Kiekhaefer | 474/153 |
| 3,713,348 A | * | 1/1973 | Conrad et al. | 474/187 |
| 3,859,865 A | * | 1/1975 | Conrad | 198/840 |
| 3,995,487 A | | 12/1976 | Locke | |
| 4,284,409 A | * | 8/1981 | Van Teslaar | 474/185 |
| 4,290,761 A | * | 9/1981 | Suginaka | 474/190 |
| 4,291,438 A | * | 9/1981 | Seiki et al. | 19/112 |
| 4,428,282 A | * | 1/1984 | Anstey | 100/88 |
| 4,449,958 A | * | 5/1984 | Conrad | 474/205 |
| 4,592,463 A | * | 6/1986 | Puskar | 198/842 |
| 4,832,186 A | * | 5/1989 | Conrad | 198/840 |
| 5,011,060 A | * | 4/1991 | Cramer | 226/15 |
| 5,129,876 A | * | 7/1992 | Brabant et al. | 493/471 |
| 5,213,202 A | * | 5/1993 | Arnold | 198/835 |
| 5,553,357 A | * | 9/1996 | Kim et al. | 19/258 |

(Continued)

FOREIGN PATENT DOCUMENTS

| | | |
|---|---|---|
| EP | 1269827 | 1/2003 |
| GB | 2201630 | 9/1988 |

OTHER PUBLICATIONS

European Search Report, 6 Pages, Nov. 12, 2010.

*Primary Examiner* — Essama Omgba
(74) *Attorney, Agent, or Firm* — Quarles & Brady LLP

(57) ABSTRACT

A drive roller for flat belts is provided in various embodiments wherein the roller has improved characteristics for maintaining traction of belts, such as lagging applied to the roller.

8 Claims, 10 Drawing Sheets

(56) References Cited

U.S. PATENT DOCUMENTS

| | | | |
|---|---|---|---|
| 5,704,861 A * | 1/1998 | Feuerborn | 474/153 |
| 5,941,168 A | 8/1999 | Kluver et al. | |
| 6,099,427 A * | 8/2000 | Brown | 474/188 |
| 6,168,544 B1 * | 1/2001 | Barnes et al. | 474/190 |
| 6,938,754 B2 * | 9/2005 | Kanaris | 198/494 |
| 7,210,573 B2 * | 5/2007 | Mol | 198/847 |
| 7,527,142 B1 * | 5/2009 | Zeltwanger et al. | 198/494 |
| 7,565,967 B2 * | 7/2009 | Maine et al. | 198/835 |
| 7,810,637 B2 * | 10/2010 | Gundlach | 198/834 |
| 2003/0173190 A1 | 9/2003 | Kanaris | |

* cited by examiner

DRIVE ROLLER FOR FLAT BELTS

FIELD OF THE INVENTION

The present invention relates generally to drive rollers for flat belts. More particularly, the present invention relates to such drive rollers used to drive flat belts in agricultural equipment such as round or cylindrical balers. Specifically, the present invention relates to such rollers which have improved characteristics for maintaining traction of belts such as lagging applied to the roller.

BACKGROUND OF THE INVENTION

A problem exists when driving a flat belt with a drive roller when contamination is present. Water, dust, or mud-like material can reduce the coefficient of friction between the drive roller and the flat belt. Particularly, problematic with agricultural balers is an accumulation of wet organic material (wet silage) which creates a 'slime' layer between the drive roller and the flat belt that can lead to extensive slipping. This problem is aggravated by the fact that the wet organic material also has a tendency to adhere to the belts and rollers.

In the past it has been recognized that it is necessary to take actions in order to reduce or eliminate such accumulations of extraneous material to maintain a positive drive. It has, for example, been known to use lagging on drive rollers in order to increase the friction between the flat belt and the lagging surface. Known lagging types used for round agricultural baler applications are smooth or finely grooved circumferentially so as to allow a path for water or other accumulations to be displaced during operation, thus preventing large decreases in the friction coefficient during operation. However, these designs are only partially effective, as measured decreases are apparent between clean and contaminated samples.

Accordingly, there is a clear need in the art for an improved drive roller, particularly for agricultural balers, that is effective to remove extraneous material from the drive roller-belt interface so as to consistently maintain the coefficient of friction necessary to maintain a positive drive.

SUMMARY OF THE INVENTION

In view of the foregoing, it is an object of the invention to provide a drive roller for flat belts.

Another object of the invention is the provision of a drive roller that is effective to remove and/or prevent the accumulation of extraneous material between the drive roller and the belt.

An additional object of the invention is the provision of a drive roller that maintains a requisite coefficient of friction to maintain a positive drive.

A further object of the invention is to provide a drive roller that is compatible with existing equipment such as round or cylindrical agricultural balers.

The foregoing and other objects of the invention together with the advantages thereof over the known art which will become apparent from the detailed specification which follows are attained by a drive roller for driving at least one flat belt, the drive roller having a roller body with lagging applied thereto the lagging having a plurality of first grooves in a surface thereof that are substantially non-parallel to the direction of travel.

In general, drive roller for flat belts is provided in various embodiments wherein the roller has improved characteristics for maintaining traction of belts, such as lagging applied to the roller.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein:

FIG. 1 is a perspective view of a driver roller and belt arrangement such as might be used in an agricultural baler or the like;

DESCRIPTION OF THE PREFERRED EMBODIMENT

Figure 1:
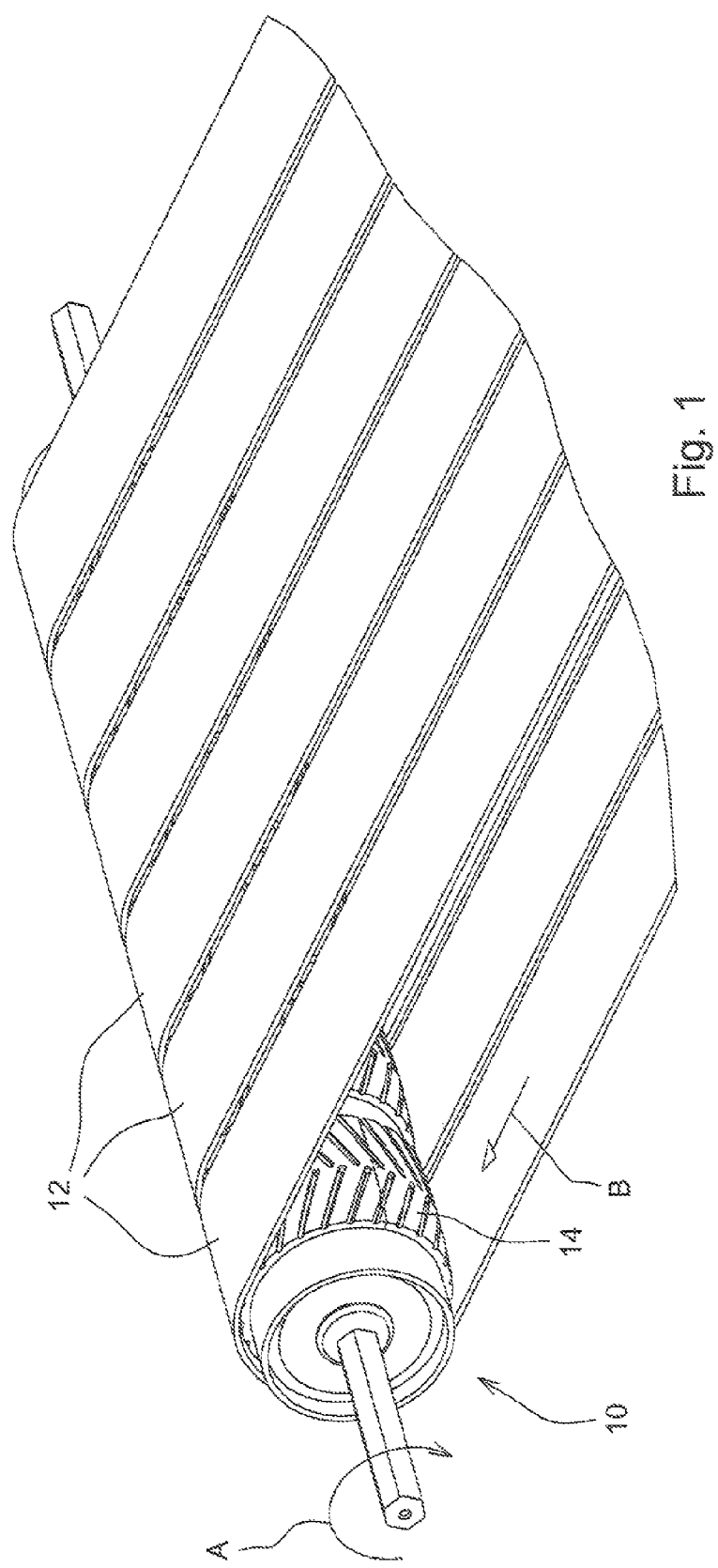
Figure 2:
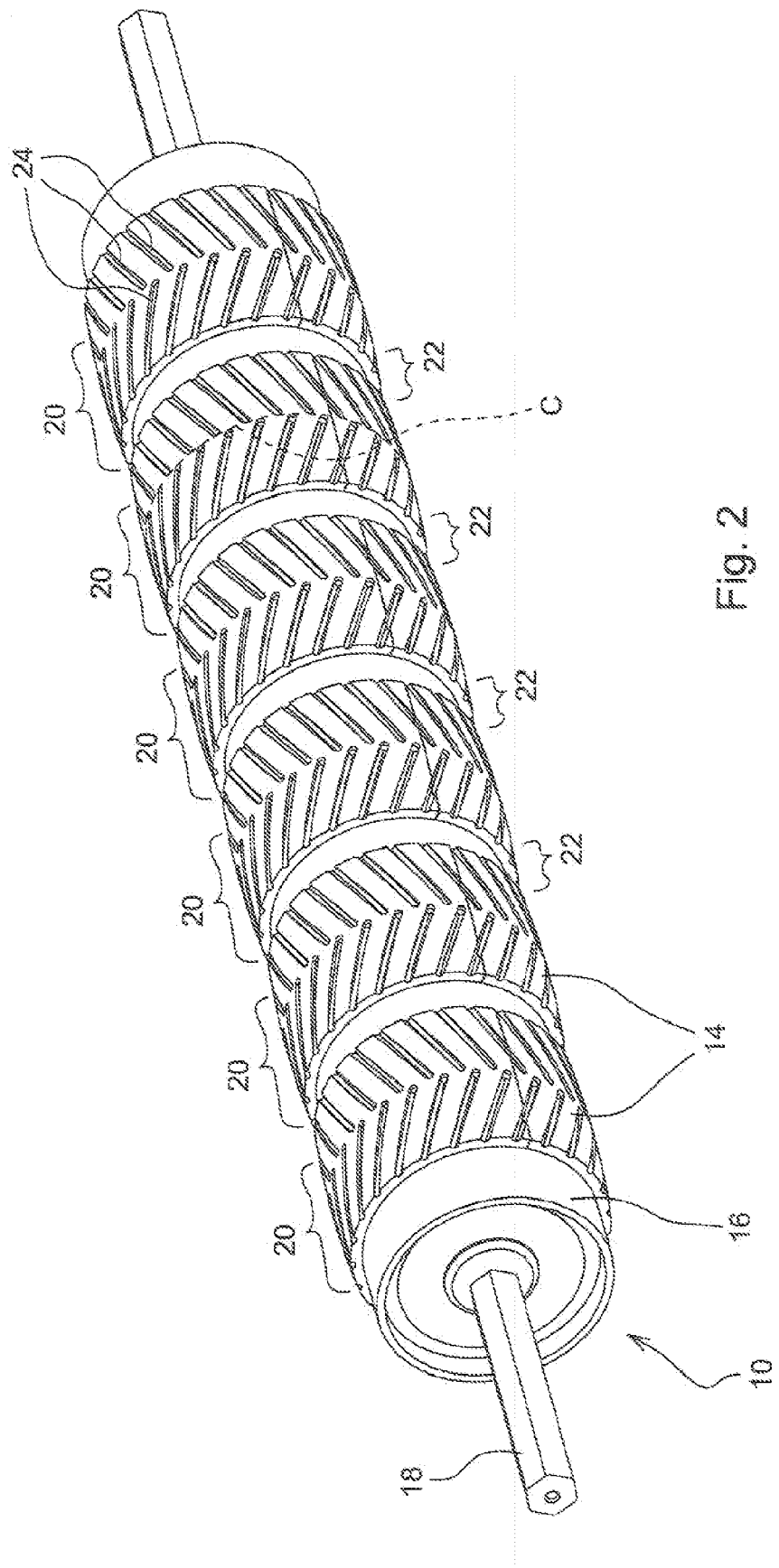
FIG. 2 is a perspective view of the roller of FIG. 1 shown without the belts.

With reference now to the drawings and more particularly to FIGS. 1 and 2, it can be seen that one embodiment of a drive roller according to the invention is designated generally by the numeral 10. As shown in FIG. 1, the drive roller 10 is illustrated in conjunction with a plurality of flat belts 12 in a configuration as might be found in an agricultural baler used for producing round or cylindrical crop bales. It can also be seen that lagging 14 has been applied to the drive roller 10 and that the belts 12 are tensioned and trained in an endless loop around the roller 10 and at least a second roller (not shown), so that each belt 12 is in frictional contact with the lagging 14. Thus as the drive roller 10 is rotated in the direction of the arrow A the belts 12 move in the direction of the arrow B. In FIG. 2 the drive roller 10 is illustrated without the belts and it can be seen that the drive roller 10 consists of a cylindrical roller body 16 which is supported on a continuous shaft 18 or on stub shafts affixed to each end of the roller body 16. Lagging 14 is applied to the roller body 16 as will be described in more detail below. The lagging 14 may be in the form of an elastomeric material that is adhered to the roller body 16 or may be machined directly into the material of the roller body or on rigid non-elastomeric parts that are affixed to the roller body 16. In any case it will be seen that the lagging 14 is applied to the roller body 16 in discrete regions 20 that correspond to the belt locations illustrated in FIG. 1. Accordingly, there are regions 22 of the roller body 16 wherein no lagging is applied. A plurality of grooves 24 are present in the lagging 14 for reasons which will be described in more detail below. In the embodiment illustrated in FIGS. 1 and 2 the grooves 24 are arranged in a herringbone pattern about the circumference of the roller 10. Each groove 24 originates close to an imaginary centerline C circumscribing the discrete lagging region 20 and extends obliquely opposite the direction of rotation of the roller 10, as illustrated in FIG. 1, to terminate with the edges of each discrete lagging region 20. The outside diameter of the lagging supports and drives the flat belt. Each groove provides a path for moisture or foreign objects to be displaced from the driving surface as such, it is preferable that the grooves empty to the side of the belt, if angled the tail of the groove can empty into an opening or channel in order to squeeze out and evacuate the accumulations. The edge of the groove (at the O.D.) is allowed to flex so as to provide a wiping action to clean the belt and grip the belt more effectively, the flexing action of this edge can also breakup accumulations on the roller surface.

Figure 3:
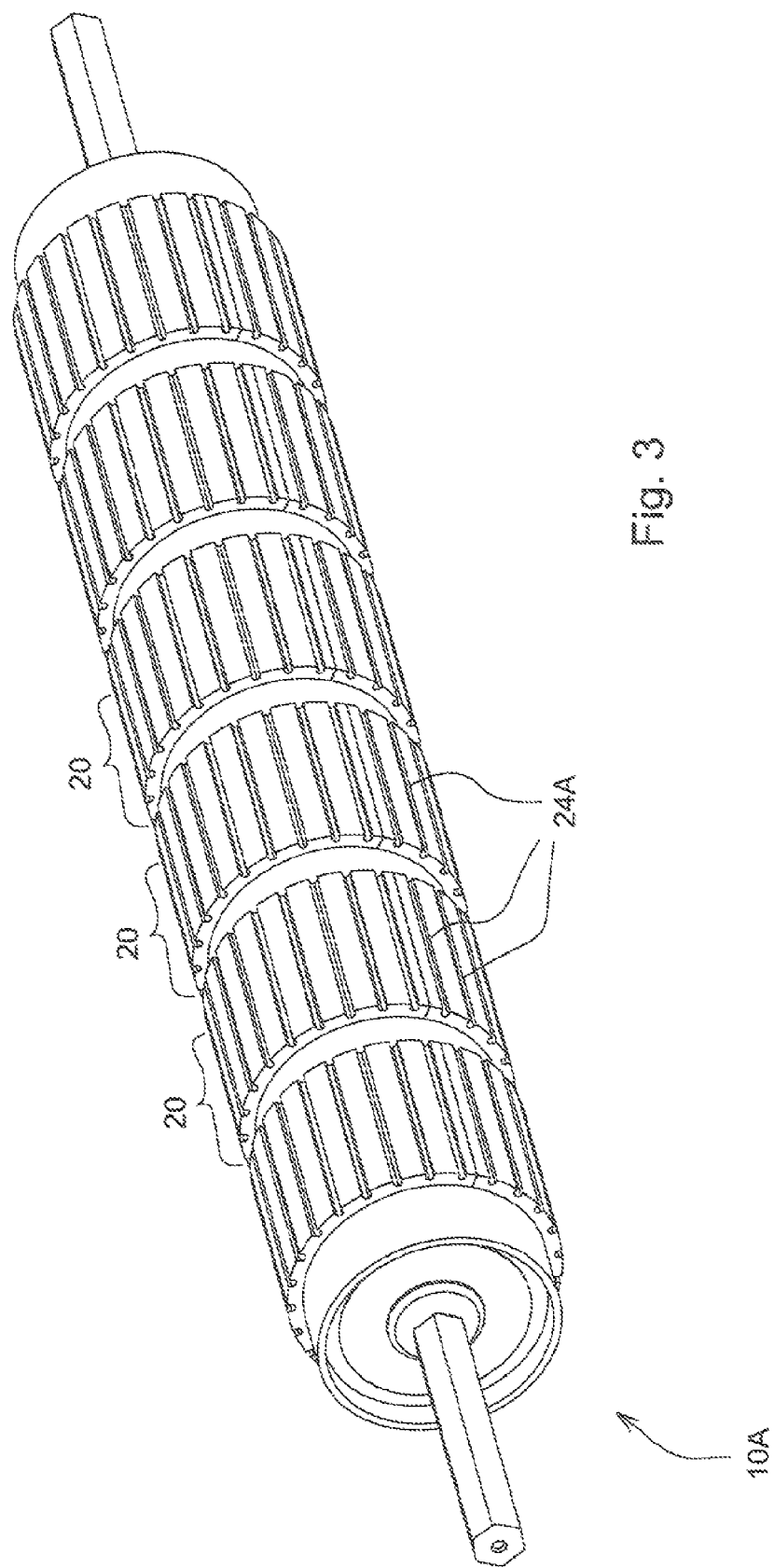
FIG. 3 is a perspective view of another embodiment of drive roller according to the invention.

With reference now to FIG. 3 it will be seen that an alternative embodiment of the roller 10 is illustrated as 10A and is identical in all respects to the embodiment of FIGS. 1 and 2 with the exception that the grooves 24A are not arranged in the herringbone pattern, but are instead oriented transversely across the circumferential face of each discrete lagging region 20.

Figure 4:
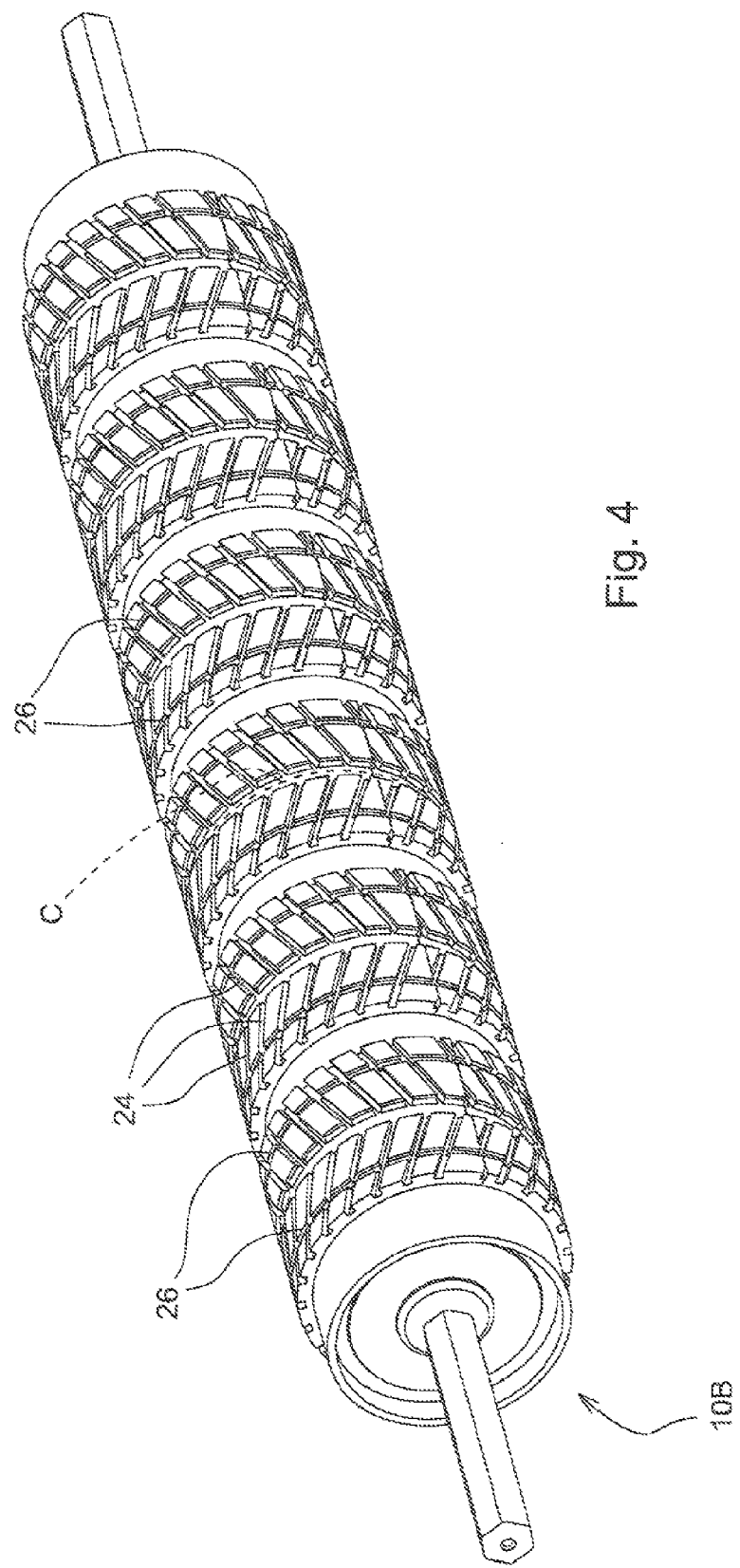
FIG. 4 is a perspective view of yet another embodiment of drive roller according to the invention.

Referring now to FIG. 4 it will be seen that another embodiment of the drive roller is illustrated as 10B. In this embodiment the grooves 24 are arranged in the herringbone pattern of FIGS. 1 and 2 and a pair of additional circumferential grooves 26 circumscribe each discrete lagging region 20 on each side of the imaginary centerline C so as to intersect each of the obliquely oriented grooves extending from the centerline C.

Figure 5:
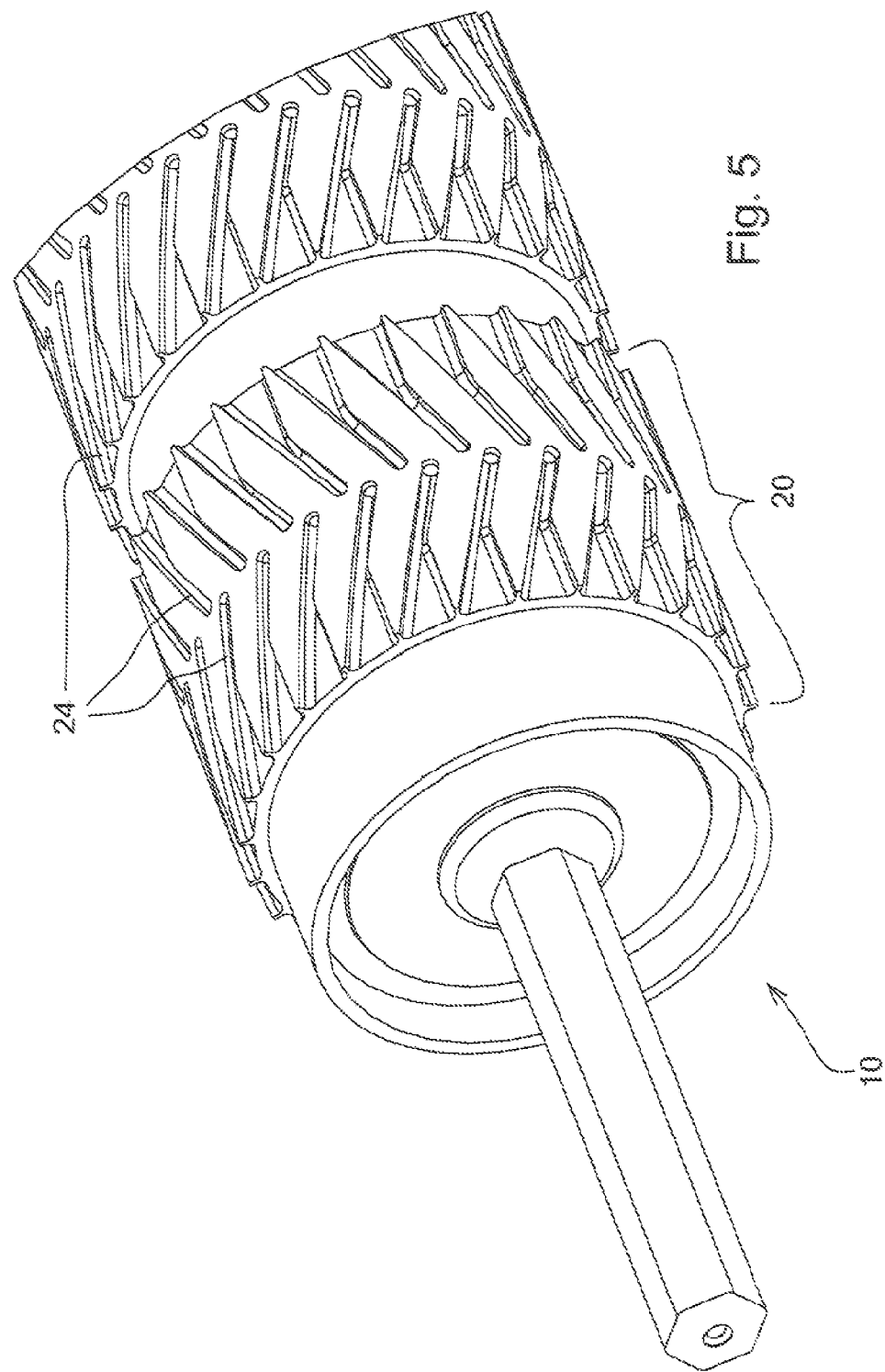
FIG. 5 is a perspective view of still another embodiment of drive roller according to the invention.

In FIG. 5 another embodiment is shown wherein the grooves 24 have a varying size, shape and/or direction along their length so as to improve the flow path of the evacuated materials. More particularly, while the grooves 24 are arranged in the herringbone pattern, each groove acutely widens near it terminus at the edge of the discrete lagging region 20 to form a Y-Shape.

Figure 6:
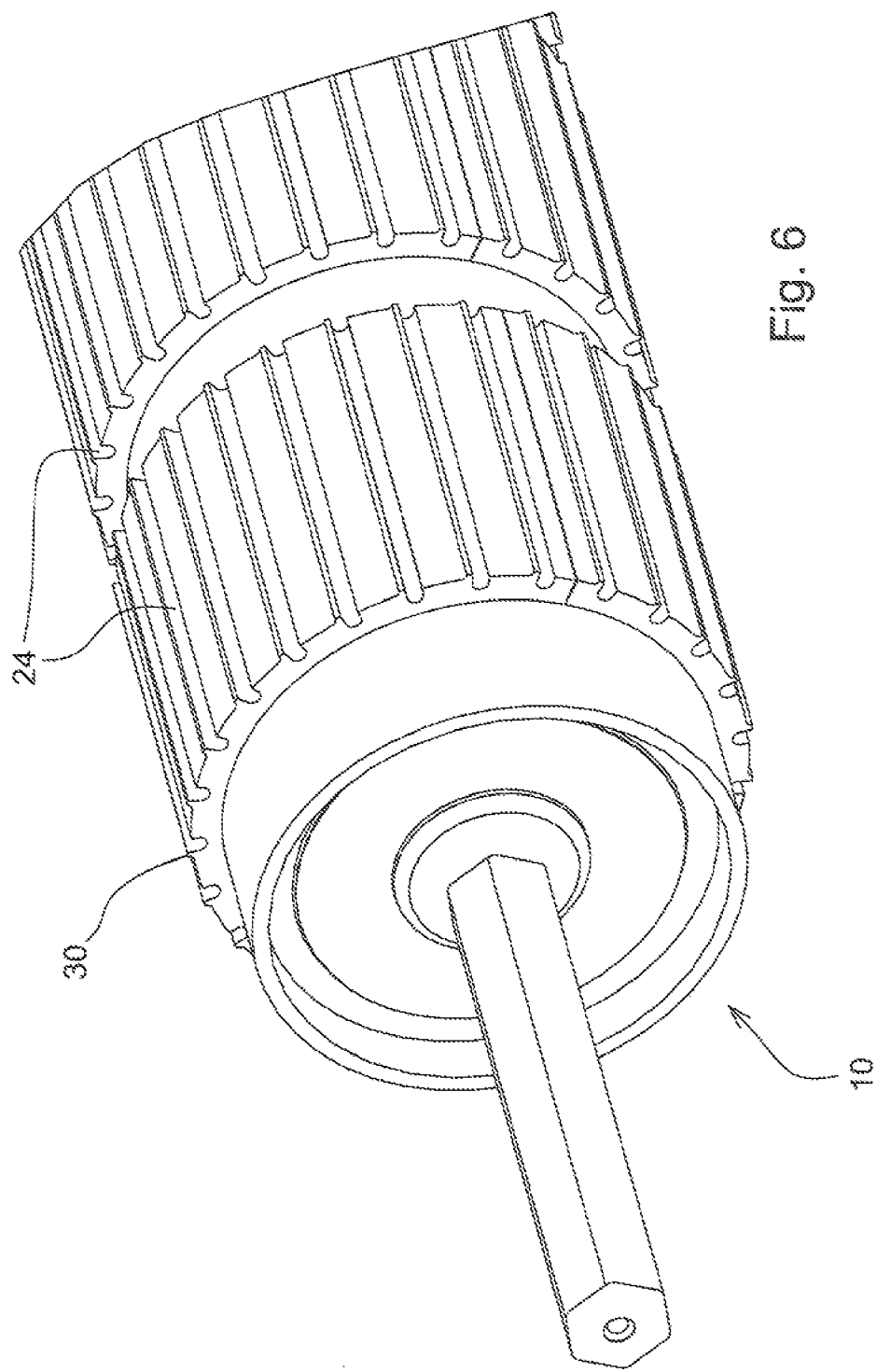
FIG. 6 is a perspective view of a further embodiment of drive roller according to the invention.
Figure 7:
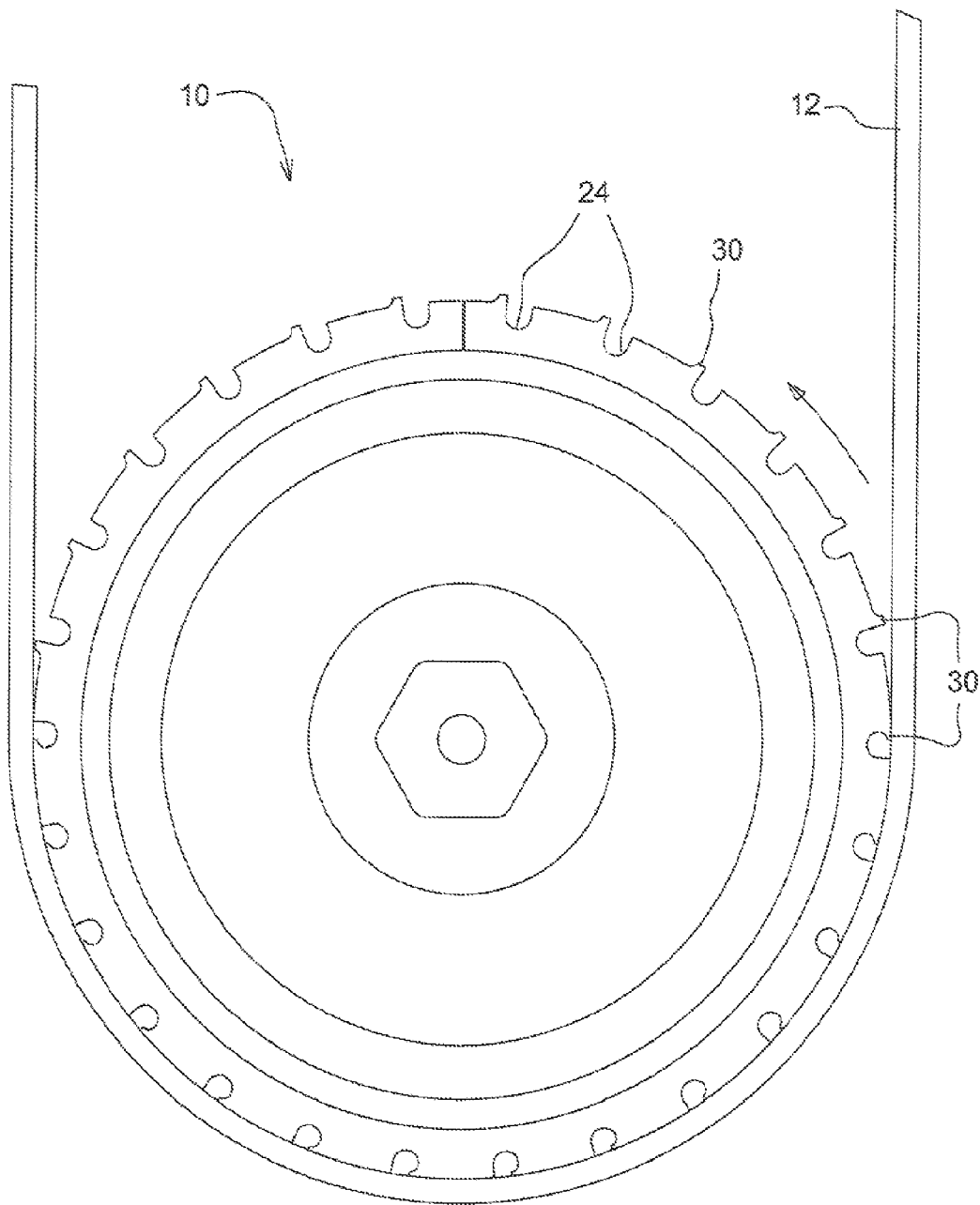
FIG. 7 is a side view of the roller of FIG. 6 and further showing the interaction of the roller with a belt.

FIGS. 6 and 7 illustrate an embodiment wherein a rib 30 is provided along one side of each groove 24. As shown the rib 30 protrudes outwardly from the lagging surface.

Figure 8:
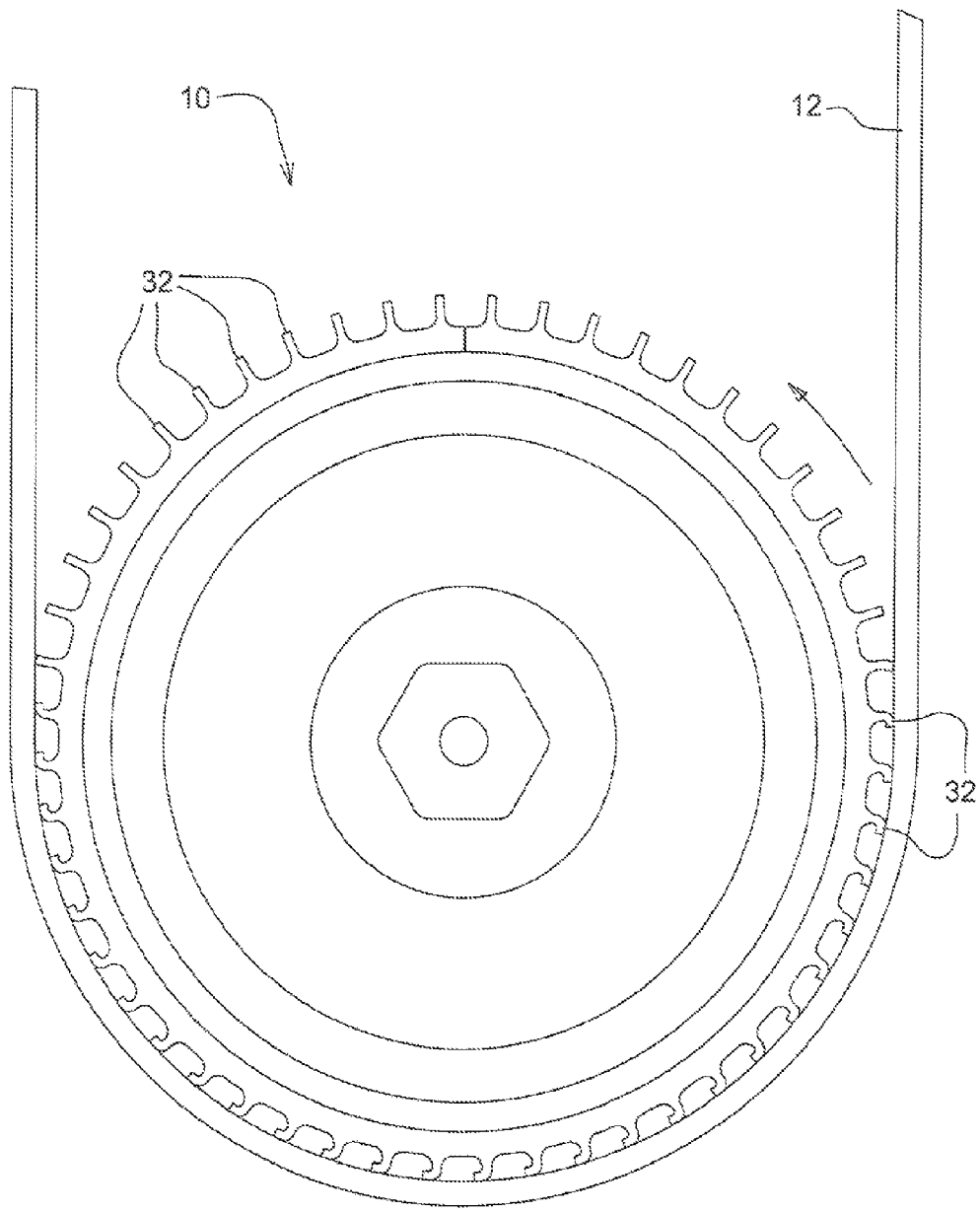
FIG. 8 is a side view of a still further embodiment of drive roller according to the invention.

During operation of the drive roller 10 the raised ribs 30 provide a wiping action relative to the belt 12 thereby further enhancing the removal of extraneous material. As shown in FIG. 7 the wiping action occurs as the belt surface engages and disengages the lagging. More particularly, the belt 12 compresses the rib 30 as the belt engages the lagging and as the belt 12 disengages the lagging, the rib 30 springs back to provide a wiping action. Similarly as shown in FIG. 8 it is contemplated that the non-grooved areas 32 of the lagging could be made sufficiently narrow so as to be flexible enough to provide a similar wiping action without the need for a raised rib.

Figure 9:
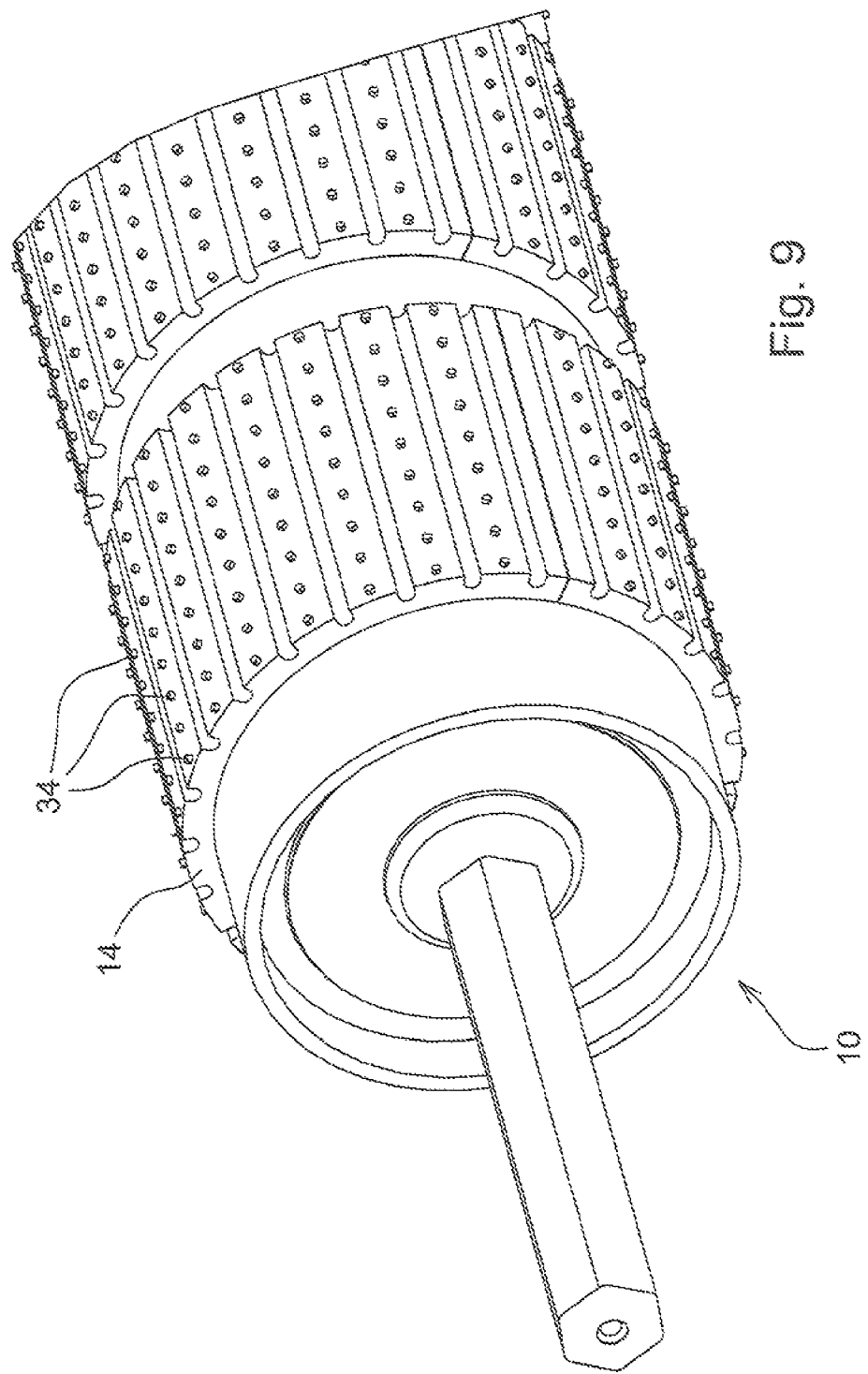
FIG. 9 is a perspective view of a further embodiment of drive roller according to the invention.

FIG. 9 illustrates an embodiment wherein the elastomeric lagging 14 is provided with a plurality of rigid non-elastomeric studs or bumps 34. It has been found that the addition of such rigid studs or bumps enhances the ability of the lagging to break up accumulations of extraneous material entrained between the belt 12 and the roller 10 and improve traction between the belt and roller.

Figure 10:
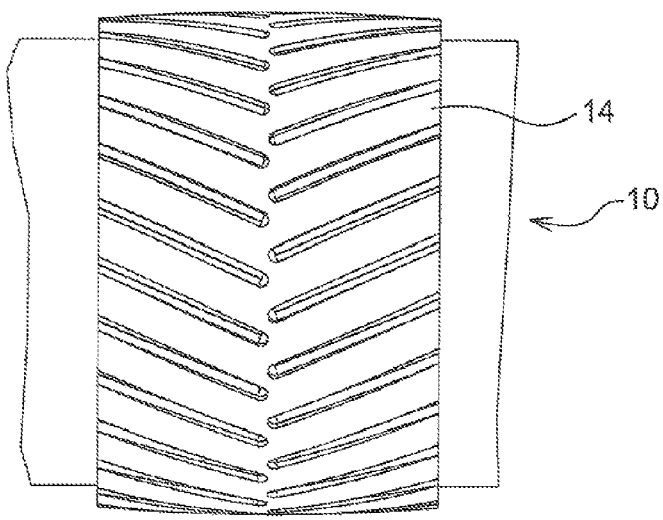
FIG. 10 is a top view of a portion of a drive roller according to an additional embodiment of the invention.

FIG. 10 illustrates an embodiment wherein the lagging 14 is crowned so as to improve tracking of the belts 12 relative to the lagging 14.

Figure 11:
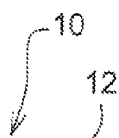
FIG. 11 is a top view of a portion of a drive roller according to still an additional embodiment of the invention; and, FIG. 12 is a top view of a portion of a drive roller according to another embodiment of the invention.
Figure 12:
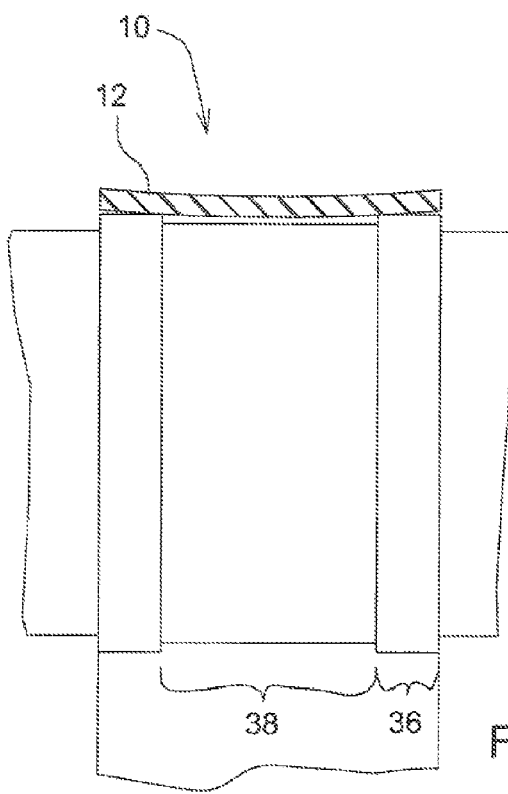

FIGS. 11 and 12 illustrate embodiments wherein the lagging 14 has a varying diameter wherein certain areas 36 of the driving surface of the lagging have a larger outside diameter than other sections 38 so as to create a speed differential and create relative movement between the belts and roller for cleaning.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

Having described the preferred embodiment, it will become apparent that various modifications can be made without departing from the scope of the invention as defined in the accompanying claims.

The invention claimed is:

1. A drive roller for driving at least one flat belt in a direction of travel, the drive roller having a roller body with lagging applied thereto in discrete regions so that a continuous circumferential channel is provided between the discrete lagging regions, the lagging having a plurality of first grooves in a surface thereof that are substantially non-parallel to the direction of travel and at least one circumferential groove intersecting the first grooves within a width of each discrete lagging region, wherein the first grooves vary in at least one of: size, shape and direction along their length, and wherein a plurality of the first grooves are arranged in a herringbone pattern and at least one of the first grooves so arranged forms a Y-shape.

2. A drive roller as set forth in claim 1 wherein the lagging surface has a constant outside diameter with the exception of the grooves.

3. A drive roller as set forth in claim 1 wherein non-grooved areas between grooves are sufficiently narrow so as to be flexible.

4. A drive roller as set forth in claim 1 wherein raised ribs are provided on the lagging surface adjacent to at least some of the first grooves.

5. A drive roller as set forth in claim 1 wherein raised protrusions are provided on the lagging surface.

6. A drive roller as set forth in claim 1 wherein a surface of the lagging is crowned.

7. A drive roller as set forth in claim 1 wherein areas of a surface of the lagging have a larger outside diameter than other areas.

8. A drive roller as set forth in claim 1 wherein the circumferential channel defines a first diameter with respect to an axis of rotation of the drive roller, and wherein at least one of the plurality of first grooves includes two internal walls connected by a floor portion, the floor portion defining a second diameter with respect to the axis of rotation of the drive roller, the second diameter being greater than the first diameter.

* * * * *